United States Patent
Tiao et al.

(10) Patent No.: US 6,254,246 B1
(45) Date of Patent: Jul. 3, 2001

(54) ILLUMINATION DEVICE AND IMAGE PROJECTION APPARATUS COMPRISING THE DEVICE

(75) Inventors: Kuo-Tung Tiao, Hsinchu; Kuang-Vu Chen, Hsin-Chuang; Fu-Ming Chuang, Hsinchu Hsien; Jinn-Chou Yoo, Hsinchu, all of (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/411,622

(22) Filed: Oct. 1, 1999

Related U.S. Application Data (62) Division of application No. 09/205,634, filed on Dec. 3, 1998.

(30) Foreign Application Priority Data

Dec. 3, 1998 (TW) ................................................ 87108195

(51) Int. Cl.$^7$ ...................................................... F21V 7/04
(52) U.S. Cl. ............................ 362/31; 362/27; 362/268; 362/19; 362/800; 362/331; 362/332
(58) Field of Search .............................. 362/268, 19, 800, 362/331, 332, 31, 27

(56) References Cited

U.S. PATENT DOCUMENTS

| | | | |
|---|---|---|---|
| 5,465,175 | * 11/1995 | Woodgate et al. | 359/463 |
| 5,587,816 | * 12/1996 | Gunjima et al. | 349/62 |
| 5,598,281 | * 1/1997 | Zimmerman et al. | 349/5 |
| 5,695,269 | * 12/1997 | Lippmann et al. | 362/31 |
| 5,745,199 | * 4/1998 | Suzuki et al. | 349/95 |
| 5,779,338 | * 7/1998 | Ishikawa et al. | 362/31 |

\* cited by examiner

Primary Examiner—Sandra O'Shea
Assistant Examiner—Ali Alavi (57) ABSTRACT

An illumination device and an image display apparatus using the same. The illumination device comprising a light source, an illumination uniformizing device, and a polarization converter. The image display apparatus comprises an illumination device provided in the invention, a synthesizing means, and a projection means.

The illumination uniformizing device has an incident plane for receiving a light emitted from the light source. Opposite the incident plane, a mirror is used as a side plane of the illumination uniformizing device to reflect the light coming from the incident plane. A bottom plane at a lower side and projection plane at an upper side of the incident plane are disposed between the incident plane and the side plane. A scattering pattern gradually condensed from the incident side toward the side plane is formed on the bottom plane, so that the light incident from the incident plane is made uniform.

12 Claims, 10 Drawing Sheets

ILLUMINATION DEVICE AND IMAGE PROJECTION APPARATUS COMPRISING THE DEVICE

CROSS-REFERENCE TO RELATED APPLICATION

This application is a Divisional of application Ser. No. 09/205,634 filed Dec. 3, 1998.

This application claims priority benefit of Taiwan application Ser. No. 87108195, filed May 26, 1998, the full disclosure of which is incorporated herein by reference.

BACKGROUND OF THE INVENTION

1. Field of the Invention

The invention relates in general to an illumination device, and more particularly, to an illumination device used in a display.

2. Description of the Related Art

The conventional projection apparatus has been widely applied in front projection type or large panel rear projection type displays. The required source has to provide enough luminance. Typically, light sources such as halogen lamps, arc lamps, for example, high pressure mercury lamps, metal halogen lamps, xenon lamps are employed. These lamps have the advantage of high luminance, but on the other side, have the disadvantages of high electricity consuming, short lifetime, and high temperature. These light sources are thus selected only while a high luminance is required.

Figure 1A:
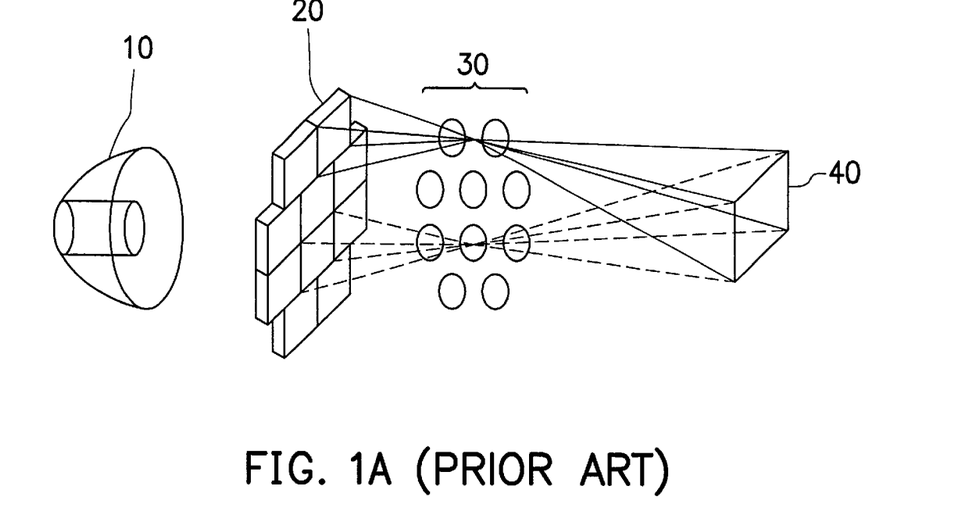
FIG. 1A and FIG. 1B show two conventional illumination devices.
Figure 1B:
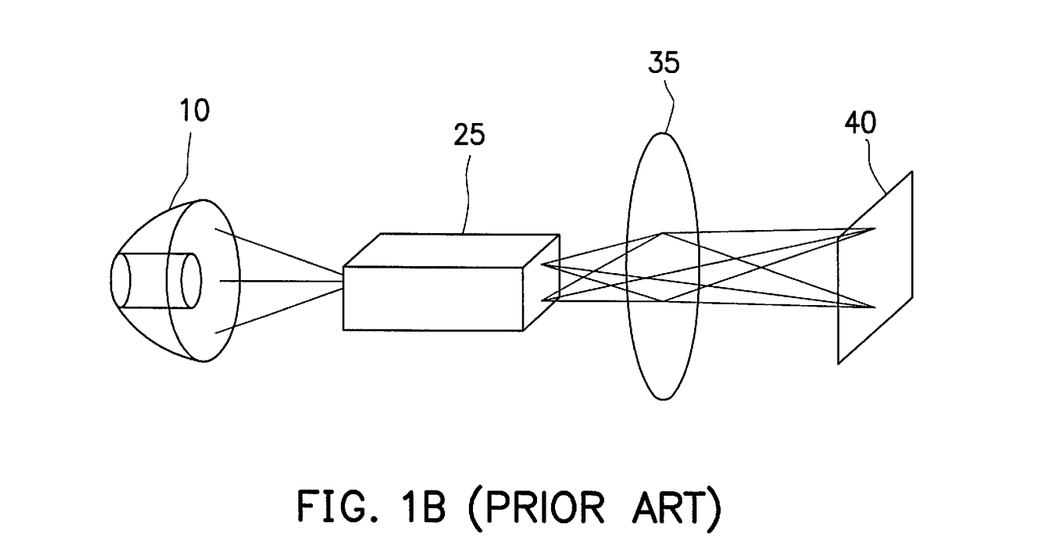

FIG. 1A and FIG. 1B show two types of conventional illumination devices. FIG. 1A is a schematic drawing of a projection apparatus disclosed in U.S. Pat. No. 5,418,583. A first lens array 20 and a second lens array integrator 30 are used to uniformize a light source 10, and to project the light source 10 onto a liquid crystal display (LCD) light valve 40. FIG. 1B is a schematic drawing of a projection apparatus disclosed in U.S. Pat. Nos. 4,656,562 and 5,634,704. A glass rod integrator 25 and a lens 35 are used to uniformize a light source 10, and to project the light source 10 onto a liquid crystal display (LCD) light valve 40. In both of the projection apparatus shown in FIG. 1A and FIG. 1B, a halogen lamp or various type of arc lamp is used as the light source 10. Therefore, the projection apparatus has very high electricity consumption, a short life time, and high temperature and is not suitable for use in a small scale display.

The diagonal length of a desktop display screen is typically in a range of about 20 inch to 30 inch. The required luminance of the light source is not as high as the front projection type or large panel back projection type displays. Moreover, the desktop screen is often in a ON status, so the light source has to keep supplying a light. Therefore, the conventional light source with a high electricity consumption, short lifetime, and a high operation temperature is not suitable to apply in a desktop display screen.

SUMMARY OF THE INVENTION

It is an object of the invention to provide an illumination device which employs a low power light emitting device as a light source. The light emitting device has the properties of low electricity consumption, long lifetime, and low operation temperature, that is, low thermal consumption. By superposing several light emitting devices on a light valve, the lifetime and the light intensity of a light source are increased of orders in magnitude. In addition, with the advantage of low operation temperature, the optical lens used in the illumination device can be selected from plastic material, so that the fabrication cost is lowered.

It is another object of the invention to provide an illumination device which includes a uniformizing means and a polarization means to efficiently apply the light supplied by the light source, and to obtain an optimum results of projection.

It is a further object of the invention to provide an image projection apparatus. The illumination device provided above is used as a light source. Therefore, the projection apparatus can obtain a high efficient projection display with a low fabrication cost.

To achieve the above-mentioned objects and advantages, an illumination device and an image projection apparatus using the illumination device are provided. The illumination device comprises at least a light emitting device. A light emitted from the light emitting device is uniformized by a uniformizing means. The light source includes an LED. Being uniformized by the uniformizing means, the light projects on a light valve such as a liquid crystal display to display an image. In the invention, various types of illumination uniformizing means can be employed and are introduced in the section of the detailed description of the preferred embodiments. By the illumination uniformizing means, an incident light can be re-distributed or converted into a way of back light panel to achieve the objective of being uniform.

In addition, most of the light valves can only receive a single type of polarization light. The illumination device thus further comprises a polarization converter to convert a light into a useful polarization type of light. Therefore, the efficiency of the light source is enhanced.

Both the foregoing general description and the following detailed description are exemplary and explanatory only and are not restrictive of the invention, as claimed.

DESCRIPTION OF THE PREFERRED EMBODIMENTS

The invention provides an illumination device comprising a light source and an illumination uniformizing means which uniformizes the light emitted from the light soruce. The light source comprises light emitting devices (LED), organic light emitting diodes (OLED), laser diode (LD), electroluminescence devices (EL), field emission display (FED), and cold cathode fluorescence lamp (CCEL). The light emitted from the light emitting devices is non-uniformly distributed and converged in a certain area. By the illumination uniformizing means, the light emitted from the light source is distributed uniformly to project on a light valve such as a LCD, for example, a projection type LCD or a projection type DMD, or a transmission type LCD, to display the image. In other words, the illumination uniformizing means utilize a distribution lens to rearrange the non-uniform incident light, or in a way of back light panel to uniformize the incident light.

Moreover, most light valves only accept one type of polarization light. The illumination device thus further comprises a polarizer, or a polarization means. The light which in unacceptable for the light valve is thus polarized to an acceptable polarized light, for example, an S-polarized light is converted into a P-polarized light. The light emitted from the light source can thus be utilized efficiently.

First Embodiment

Figure 2A:
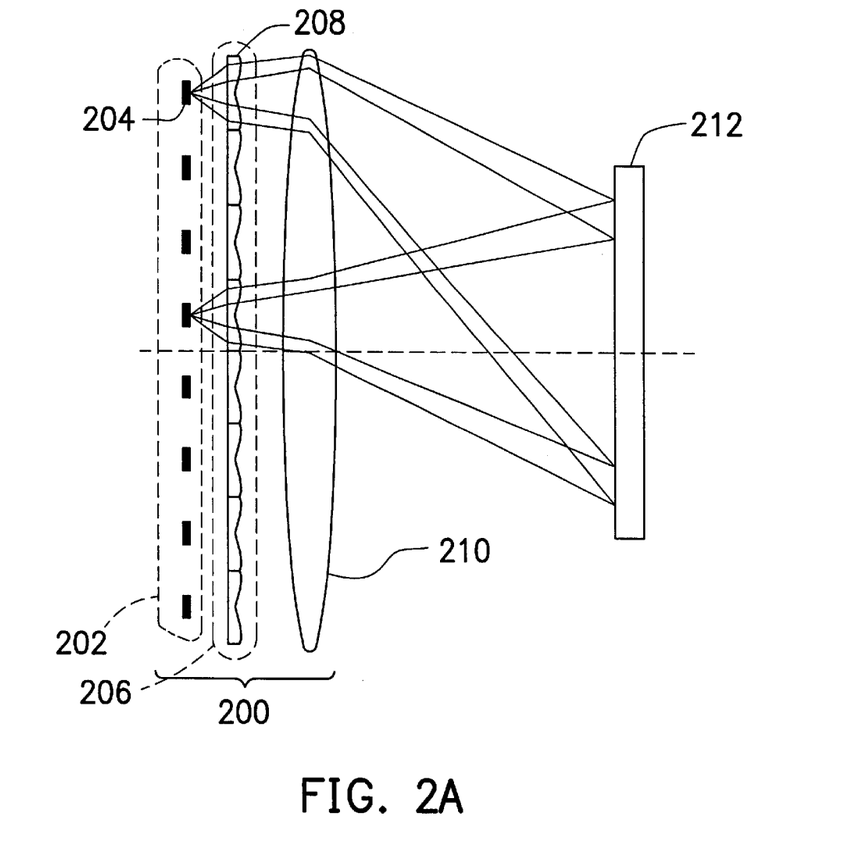
FIG. 2A shows a first embodiment of an illumination device according to the invention.

In FIG. 2A, an illumination device in the first embodiment according to the invention is shown. The illumination device 200 comprises a light source 202 and an illumination uniformizing means. The light source 202 includes a planar array of light emitting devices 204, while the illumination uniformizing means comprises a planar light distribution lens array 206 and a light converging lens 210. The light distribution lens array 206 further comprises a number of lenses 208, and the optical axis of the light emitting device 204 is overlapped with the optical axis of the corresponding light distribution lens 208. The light converging lens 210 is used to project a light emitted from the light distribution lens array 206 to a light valve 212. The light valve 212 can be an LCD.

Since the light emitting device emits a non-uniform light, the light intensity along its optical axis is more intensive than the position far away from the optical axis. The theory of uniformizing the light emitted from the light emitting device by the light distribution lens 204 and the light converging lens 210 is introduced as follows.

Figure 2B:
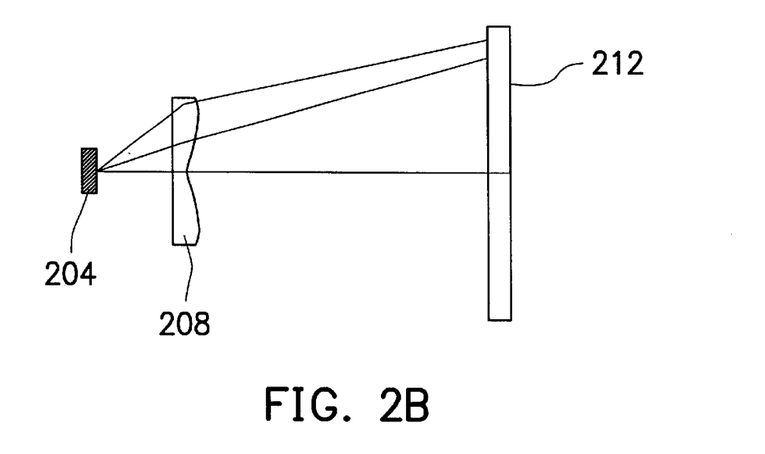
FIG. 2B shows a light distribution lens used in the illumination device shown in FIG. 2A.

In FIG. 2B, a set of the light emitting device 204 and a light distribution lens 208 are shown. The middle part of the light distribution lens 208 is a negative lens, that, the light intensity along the optical axis emitted from the light emitting device 204 is distributed to the rimland of the light valve 212. The edge parts of the light distribution lens 208 are positive lens or lens with smaller curvature, so that the light emitted from the edge part of the light emitting device 204 is only diverted or bent with a small angle. As a consequence, the non-uniform light emitted from the light emitting device 204 is rearranged and re-distributed as a uniform light.

Through the light converging lens 210, the light from each of the light distribution lens 208 in the light distribution lens array 206 is directed, overlapped and projected onto the whole LCD light valve. A uniform projection light is thus distributed on the whole LCD light valve.

Figure 2C:
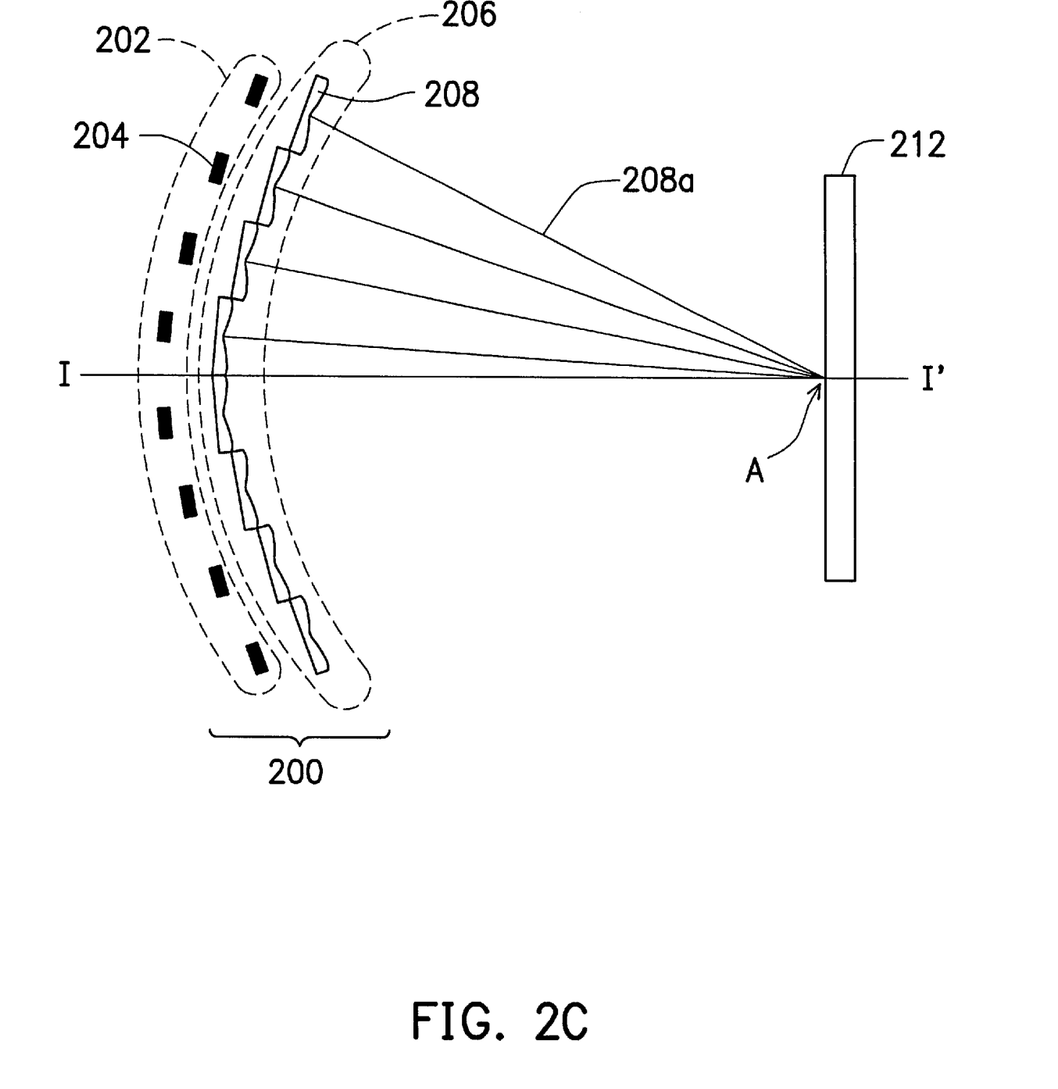
FIG. 2C shows a modification of the first embodiment.

In FIG. 2C, a modification of the illumination device shown in FIG. 2A is shown. The light distribution lenses 208 of the light distribution lens array 206 are arranged in a curved shape with a curvature, where the light converging lens 210 shown in FIG. 2B is not included. The profile of the light distribution lens array 206 is like a concave lens having a central axis I–I'. The optical axis 208a of each light distribution lens 208 is directed towards a center point A of the light valve 212. The center point A is located at the central axis I–I'. Again, each light distribution lens 208 of the light distribution lens array 206 is disposed with a light emitting device 204. The profile of the light source 202 which comprises light emitting devices 204 is similar to it of the light distribution lens array 206 to provide a light to the illumination device 200.

In the first embodiment, the non-uniform light emitted from the light emitting devices is uniformized by an illumination unifromizing means. The illumination uniformizing means comprising a planar light distribution lens array and a light converging lens, or alternatively, a curved light lens array can be used instead of the above combination. A Fresnel type lens may also be used to replace the combination of the light distribution lens and the light converging lens. In addition to the Fresnel type lens, distribution lens such as holographic optic element (HOE) or binary optical device may also be employed. The distribution lenses and the focus means can assembled as a compound optical lens apparatus. The compound optical lens may also be a holographic type. The binary optical device may be formed by microelectronic fabrication technique based on principle and theory of optical diffracton and computer technique. The binary optical device comprises a double value type device, for example, device through which only light with two phases can pass, or a multi-value device which has multiphase characteristic.

With a low power light source, the power consumption is low. Therefore, the light distribution lenses and the light converging lens can be fabricated from plastic material. In addition to the low power consumption, the illumination device provided in the first embodiment has a further advantage of low fabrication cost.

Second Embodiment

Figure 3A:
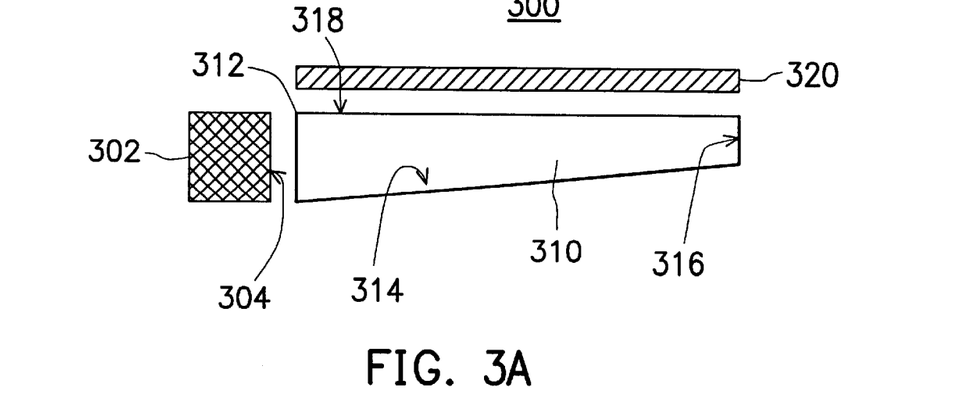
FIG. 3A shows a second embodiment of the invention.

FIG. 3A shows a second embodiment of the invention. A back light panel type of uniformizig means is used to uniformize a light emitted from a light source.

Figure 3B:
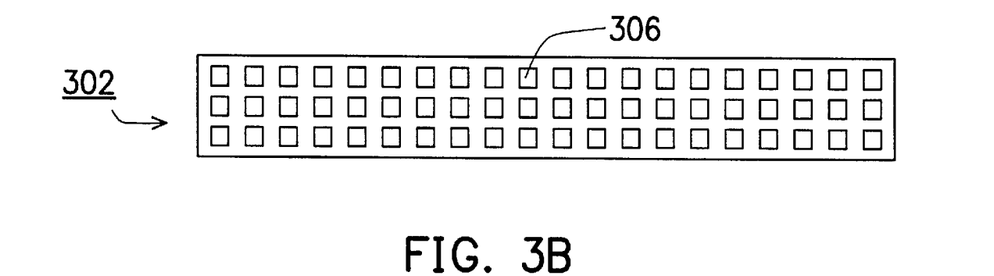
FIG. 3B shows an example of the arrangement of the LED light source shown in FIG. 3A.
Figure 3C:
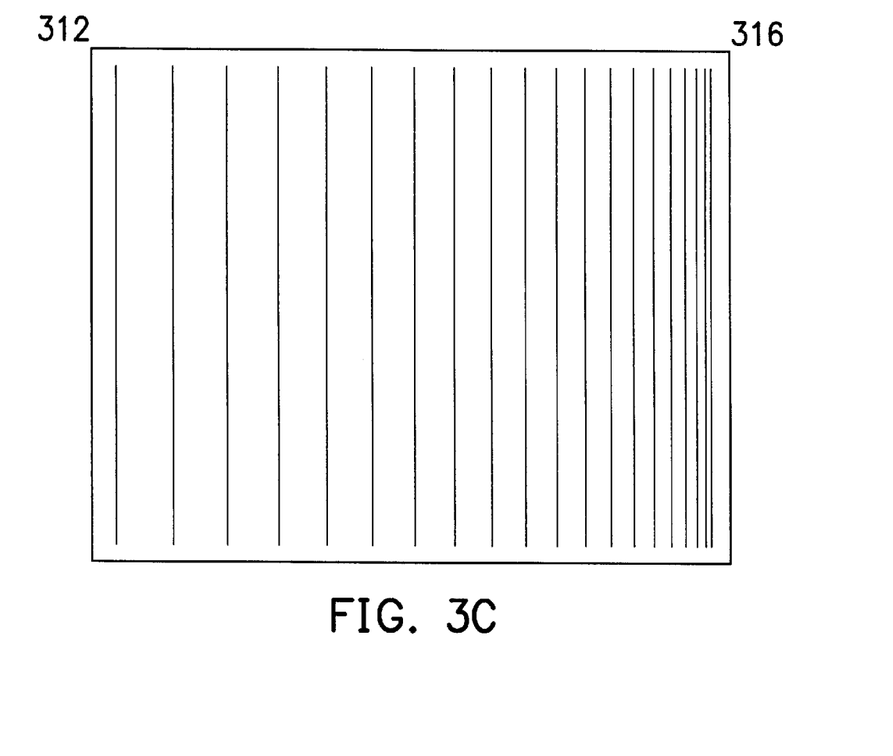
FIG. 3C and FIG. 3D show two examples of scattering mechanism of the illumination uniformizing means shown in FIG. 3A.
Figure 3D:
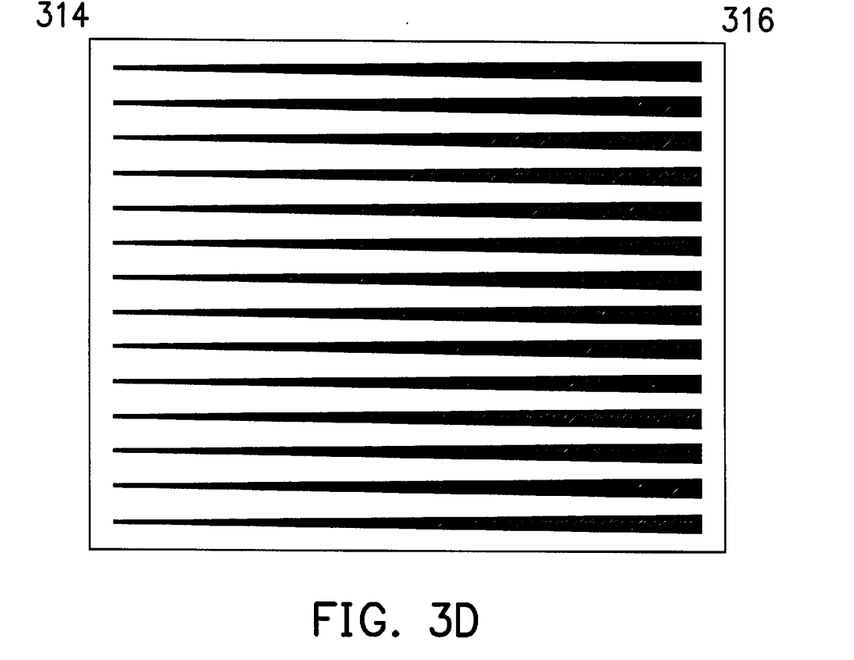

An illumination device comprises a light source 302 and an illumination uniformizing means 310. The light source 302 comprises an array of light emitting devices 306 shown as FIG. 3B. The uniformizing means 310 includes a wedged back light panel. The uniformizing means comprises an incident plane 312, a bottom surface 314, a top plane 318, and a side plane 316 opposite to the incident plane 312. The side plane 316 includes a mirror to reflect a light emitted from the light source 302. The bottom plane 314 further comprises a scattering pattern as shown in FIG. 3C or FIG. 3D.

The bottom plane 314 of the illumination uniformizing means 310 has both functions of transmitting and scattering a light. When a light emitted from the light source 302 is incident into the illumination uniforming means 310 through the incident plane 312, the light is totally reflected by the bottom plane 314 and the projection plane 318 and travelling in between. When the light is incident on the scattering pattern of the bottom plane 314, the light is scattered to transmit through the projection plane 318 to the light valve 320.

It is known that the illumination intensity of the light emitted from a light emitting devices decreases with increasing distance. Therefore, the light reaching the incident plane 312 is stronger than the light reaching the side plane 316. To achieve the objective of obtaining a uniform light distribution on the light valve 320, the light scattered from the bottom plane 314 closer to the incident plane 312 has to be weaker than the light scattered from the bottom plane 314 closer to the side plane 316. The scattering pattern designed as FIG. 3C and FIG. 3D can achieve the object. As shown in the figure, the scatter pattern is gradually condensed from the incident plane to the side plane.

By the design of the scattering pattern on the bottom plane 314, a non-uniform light emitted from the light emitting devices 204 is uniformized to project onto the light valve 320.

In addition, the light incident on the side plane 316 is reflected to be utilized iteratively to enhance the efficiency of the light source.

Figure 3E:
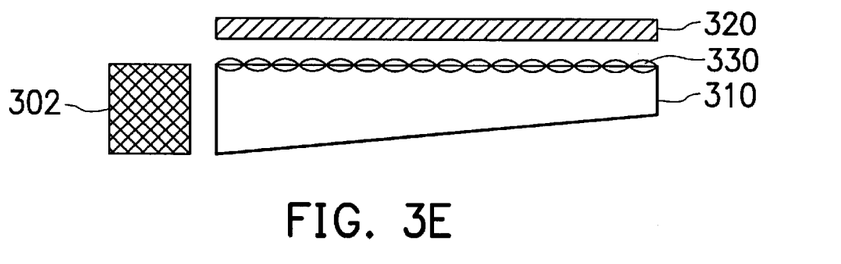
FIG. 3E shows a modification of the second embodiment.

FIG. 3E shows a modification of the second embodiment. A set of light converging means 330 is disposed on the projection plane 318 to collimate the light scattered by a large angle. The light converging means 330 includes a lens array. To identify the center of each lens of the light converging means 330 and each center of the corresponding scattering pattern, the operation can thus be optimized.

In this embodiment, a wedged back light panel is used as an illumination uniformizing means instead of the light distribution lens array in the first embodiment. Similar to the first embodiment, with the low power light source such as light emitting devices, a low operating temperature is reached. Therefore, the optical elements can be fabricated from plastic material. In addition to the low power consumption, the illumination device provided in the first embodiment has a further advantage of low fabrication cost.

The Third Embodiment

When a light valve can only accept a certain type of polarized light, only half of the incident light can be used, therefore, the illumination effect is not satisfactory.

Figure 4:
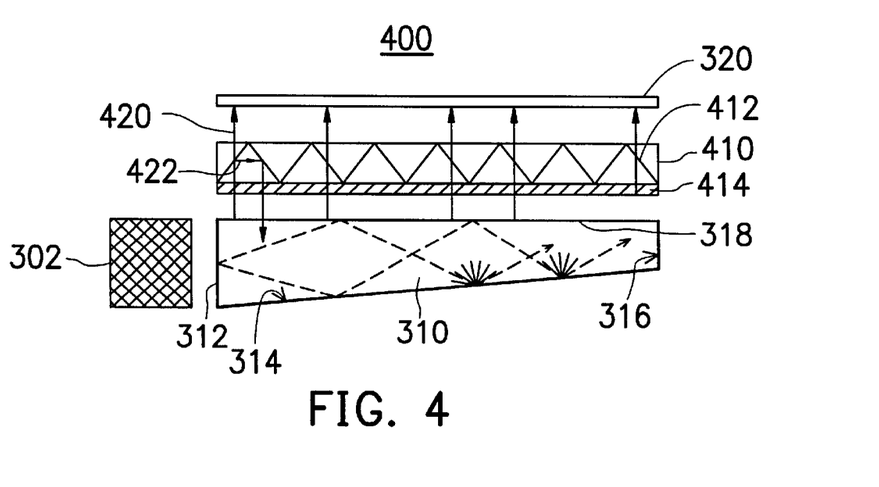
FIG. 4 shows a third embodiment of the invention.

In FIG. 4, a third embodiment of the invention is shown. The element and theory of this embodiment are basically the same as those in the second embodiment. The additional element is a polarization converter 410 is disposed between the light valve 320 and the illumination uniformizing means 310. Therefore, the light unacceptable to the light valve 320 is converted into an acceptable type of polarized light to the light valve 320, so that the light emitted from the light source can be fully utilized.

The polarization converter 410 comprises ¼ wavelength plates 414 at one plane thereof and a plurality of polarization beam splitters 412. Each polarization beam splitter 412 is disposed on a corresponding ¼ wavelength plates 414 and arranged in a zigzag form. The adjacent polarization beam splitters 412 are arranged with a right angle between each other.

As mentioned in the second embodiment, when a light emitted from the light source 302 is incident into the illumination uniforming means 310 through the incident plane 312, the light is totally reflected by the bottom plane 314 and the projection plane 318 and travelling in between. When the light is incident on the scattering pattern of the bottom plane 314, the light is scattered to transmit through the projection plane 318 to the light valve 320. The scattered light comprises both P-polarized 420 and S-polarized lights 422.

In the case that the light valve only accepts a P-polarized light 420, the S-polarized light 422 thus cannot be utilized at all. Traveling through the polarization beam splitter 412, the P-polarized light 420 and the S-polarized light 422 of the scattered light are split. The P-polarized light 420 passes through and projects on the light valve 320, while the S-polarized light 422 is reflected by two adjacent polarization beam splitter 412. Passing through the ¼ wavelength plates 414, the S-polarized is polarized into a circular polarized light and traveling back to the illumination uniformizing means 310. When the circular polarized light is scattered by the scattering pattern on the bottom plane 314, passing through the polarization converter 410, the circular polarized light is then polarized into a P-polarized light to be accepted by the light valve 320. Thus, the light emitted from the light source 302 can be fully utilized and projected into the light valve 320 efficiently.

Furthermore, the light converging lens, for example, a lens array, can also be dispose on the projection plane 318 of the illumination uniformizing means 310. The scattered light with a large scattered angle can thus be collimated to project on the light valve 320.

In addition to the advantages mentioned in the first and the second embodiments, by disposing a polarization converter, a light emitted from a light source can be fully transformed and projected onto the light valve, so that a better illumination is obtained.

The Fourth Embodiment

Figure 5A:
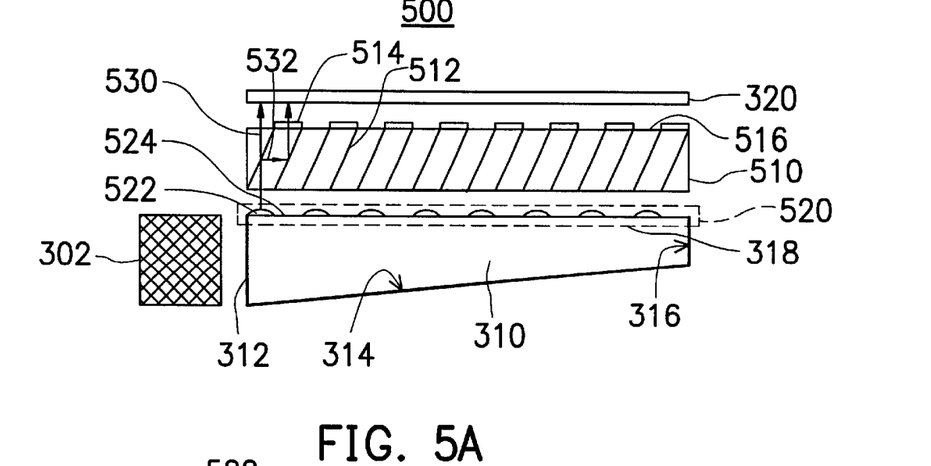
FIG. 5A shows a fourth embodiment of the invention.
Figure 5B:
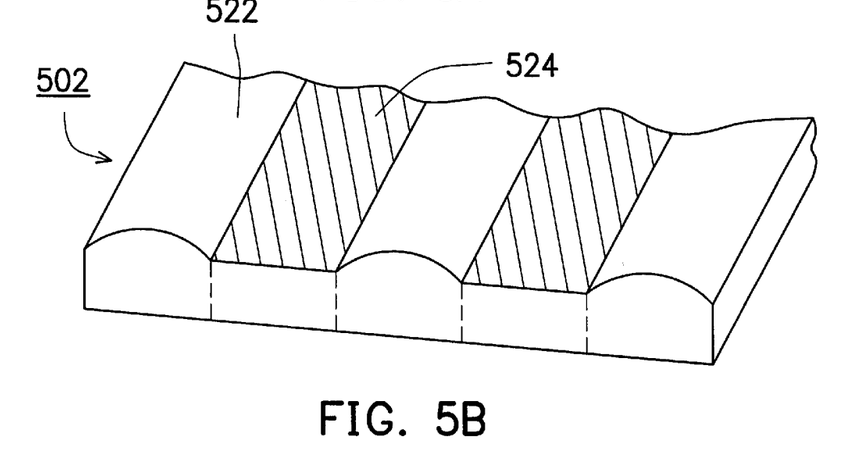
FIG. 5B and FIG. 5C shows two types of light converging lens used in the fourth embodiment.

FIG. 5A shows the fourth embodiment of the invention. The elements and arrangement of the fourth embodiment are substantially the same as those in the third embodiment. The difference between the third and the fourth embodiments is the polarization converter 516 employed between the illumination uniformizing means 310 and the light valve 320.

In FIG. 5A, a polarization converter 510 comprises a plurality of polarization beam splitters 512 and ½ wavelength plates 514. The polarization beam splitters 512 are parallel from each other, while the ½ wavelength plates 514 are disposed on every other polarization beam splitters 512 on a plane 516 of the polarization converter 510.

Again, when a light emitted from the light source 302 is incident into the illumination uniforming means 310 through the incident plane 312, the light is totally reflected by the bottom plane 314 and the projection plane 318 and travelling in between. When the light is incident on the scattering pattern of the bottom plane 314, the light is scattered to transmit through the projection plane 318 to the light valve 320. The scattered light comprises both P-polarized 530 and S-polarized lights 532.

Considering a light valve 320 accepts a P-polarized light only. When the scattered light reaches the polarization beam splitter 512, the P-polarized light 530 pass through to illuminated the light valve 320, while the S-polarized light 532 is reflected by two adjacent polarization beam splitters 512. The reflected S-polarized light 532 then travels through the ½ wavelength plate 514 to be converted to a P-type polarized light and thus to illuminate the light valve 320. This embodiment convert all the incident light from the light source into a type of polarized light which can be accepted by the light valve, therefore, a high efficiency is obtained.

Figure 5C:
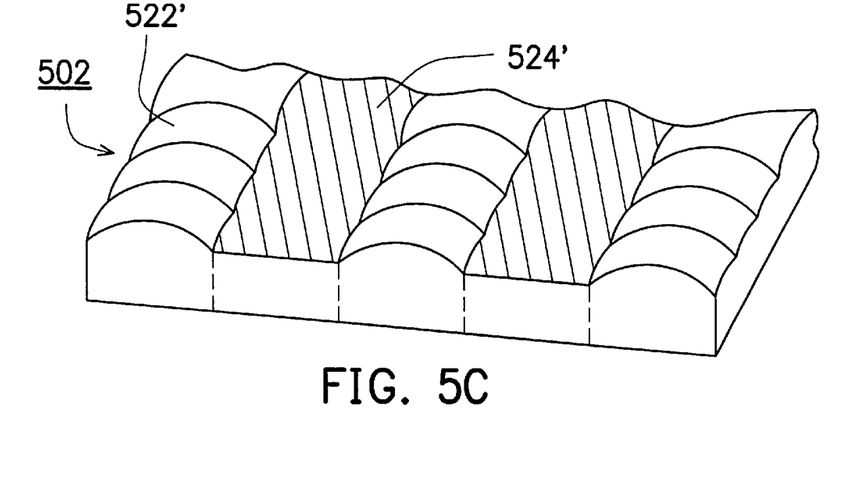

Moreover, a set of light converging lens 520 can also disposed on the projection plane 318 of the illumination uniformizing means 310. The set of light converging lens 520 comprises a plurality of collimate cylindrical lenses 522 and mirrors 524. The collimate cylindrical lenses 522 and the mirrors 524 are disposed alternately on the projection plane 318. That is, each collimate cylindrical lens 522 is arranged between two mirrors 522, while each mirrors 524 is located between two collimate cylindrical lenses 522. Each collimate cylindrical lens 522 can be replaced by a rows of lens 522' as shown in FIG. 5C. Each of the mirrors 524 is disposed on the projection plane 318 aligned with a corresponding ½ wavelength plate 514. In addition, by aligning the optical center of each light converging lens 520 with the center of each scatter pattern, a better operation performance is obtained.

To lower the fabrication cost, the collimate cylindrical lens 522 can be replaced by Fresnel lens, or the collimate cylindrical lens 522 and mirrors 524 can be fabricated by material like plastic.

In addition, the collimate cylindrical lens 522 may also be replaced by holographic optic element or binary optical device.

The embodiment effectively utilize the light emitted from the light source to illuminate the light valve with a low fabrication cost.

From the second to the fifth embodiment, a back light panel type illumination uniformizing means is used with a single light emitting device as a light source to illuminate a light valve. In practical use, more than one light emitting devices can be used as the light source to illuminate a light valve.

Figure 6A:
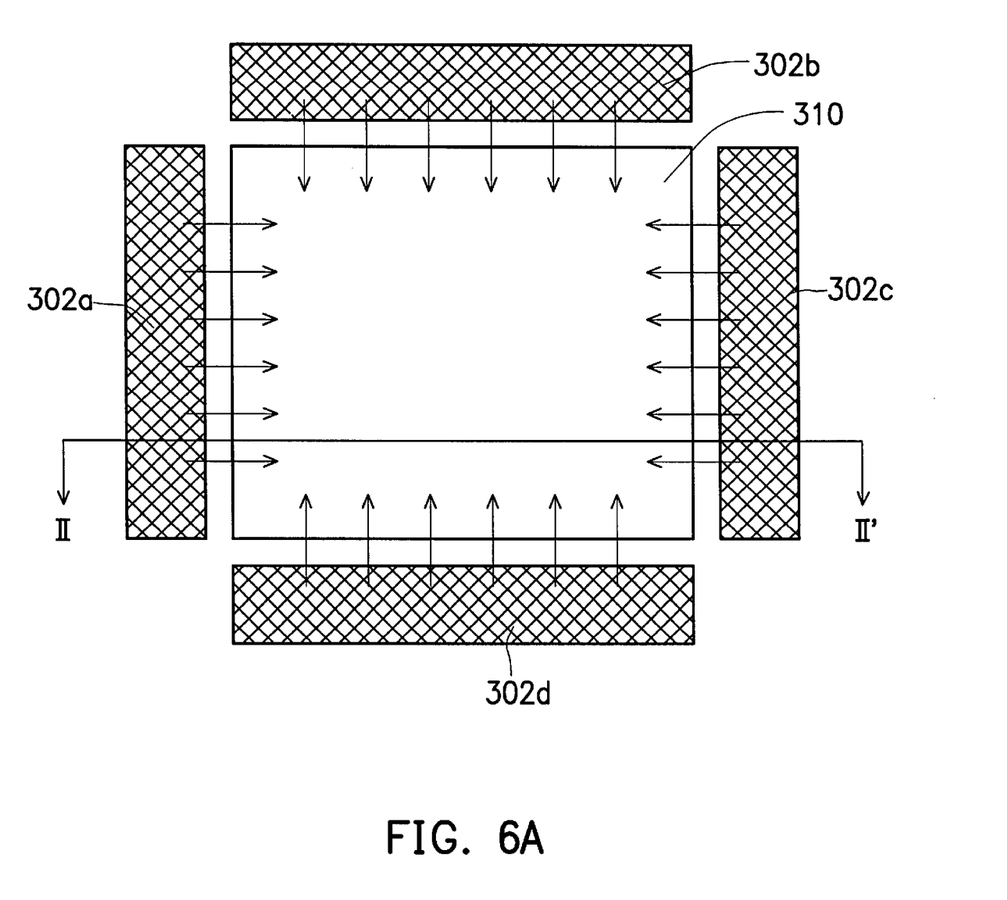
FIG. 6A shows an example of multiple sets of light emitting device light source incident to a back light plate.

FIG. 6A shows a top view of an illumination device adapting four light emitting devices as a light source. The light valve and the polarization converter are not shown in the figure. Four light emitting devices 302a, 302b, 302c, and 302d are used in this embodiment to emit a light onto four side planes of an illumination uniformizing means respectively. According to the specific requirements of a practical application, any number of the light emitting devices can be applied as a light source.

Figure 6B:
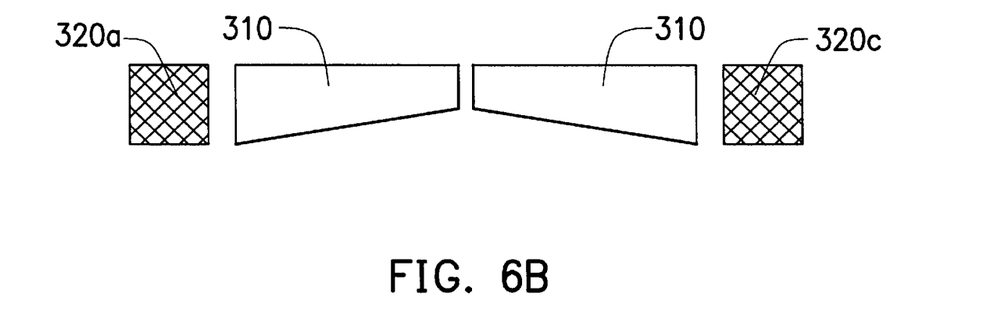
FIG. 6B is a cross section view along the line II–II' in FIG. 6A.

FIG. 6B is a cross sectional view alone the cutting line II to II' in FIG. 6A. Since the light intensity decays with distance, the scatter pattern has to be gradually intensively distributed as increasing the distance to the light source. When two lights of light emitting devices 302a and 302c are incident onto two opposite side planes, two back light panels 310 are required as shown in FIG. 6B.

The Fifth Embodiment

Figure 7A:
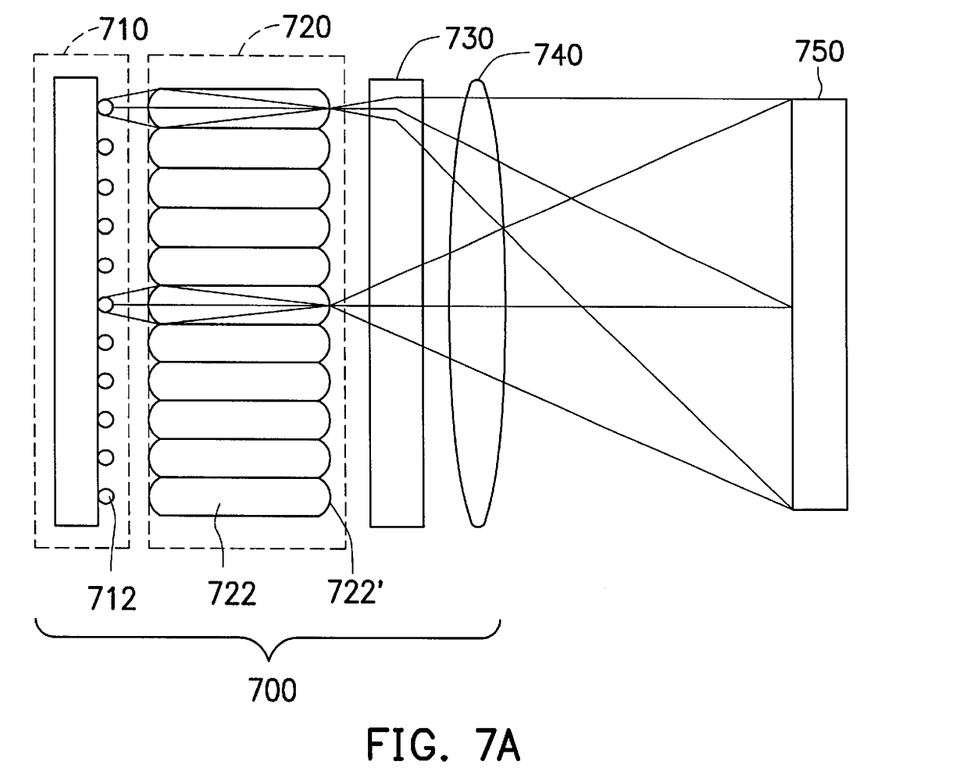
FIG. 7A shows a fifth embodiment of the invention.

FIG. 7A shows a fifth embodiment of the invention, in which an integrator is used as an illumination uniformizing means.

In FIG. 7A, an illumination device 700 comprises a light emitting device light source module 710, a light integration array, that is, an integrator 720, a polarization converter 730, and a light converging lens 740. The light source module 710 further comprises an array of Light emitting devices 712. The integrator 720 comprises a plurality of columnar light converging lens 722 into a lens array, and each of the columnar light converging lens corresponding to one LED 712. Each light emitted from the LEDs is to incident the corresponding columnar light converging lens 720 and converged thereby. By stacking the light converged on each projection plane 722', the light is uniformized to project to the polarization converter 730. The polarization converter 730 converts the incident light into a polarization type of light acceptable for a light valve 720. Before reaching the light valve 720, the light travels through a light converging means 740 disposed in front the polarization converter 730 to be converged.

The incident plane and the projection plane of each columnar light converging light can be either a spherical plane or a non-spherical plane. A Fresnel type lens can be used as the columnar light converging lens 722 and the light converging means 740.

Figure 7B:
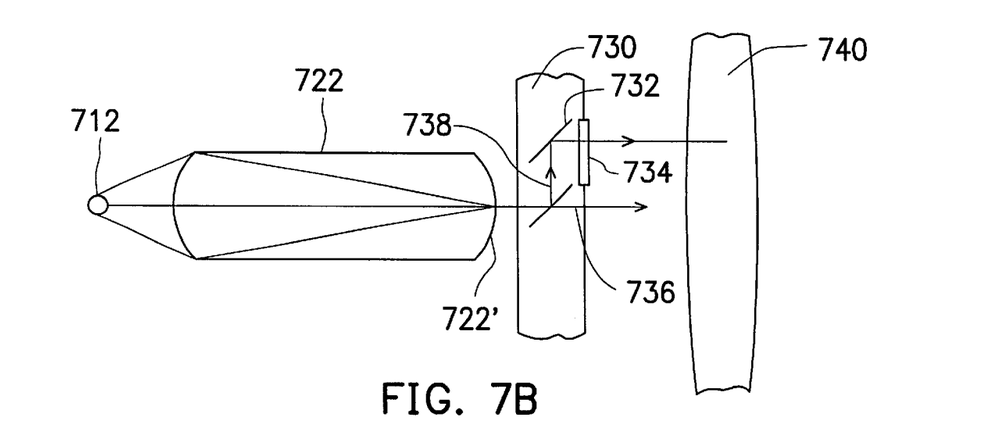
FIG. 7B shows the operation mechanism of the polarization means shown in FIG. 7A.

The mechanism of the polarization converter 730 is shown as FIG. 7B. The theory of the polarization converter 730 is the same as it of the polarization converter 510 introduced in the fourth embodiment. Considering the light valve 720 accepts a P-polarized light only. The P-polarized 736 light from the integrator 722 travels through a polarization beam splitter 732 of the polarization converter 730 to illuminated the light valve 720, while the S-polarized light 738 is reflected by two adjacent polarization beam splitters 732. The reflected S-polarized light 738 then travels through the ½ wavelength plate 734 to be converted to a P-type polarized light and thus to illuminate the light valve 720. This embodiment convert all the incident light from the light source into a type of polarized light which can be accepted by the light valve, therefore, a high efficiency is obtained.

Similar to the above mentioned embodiments, the lens used in the embodiment may be made from plastic material which has a lower fabrication cost. The light converging lens may adapt holographic optical element or binary optical device.

In addition, each the light emitting devices do not have to correspond a certain one to the cylindrical light converging lenses, that is, more than one light emitting device may be disposed to correspond to a cylindrical light converging lens.

The Sixth Embodiment

Figure 8A:
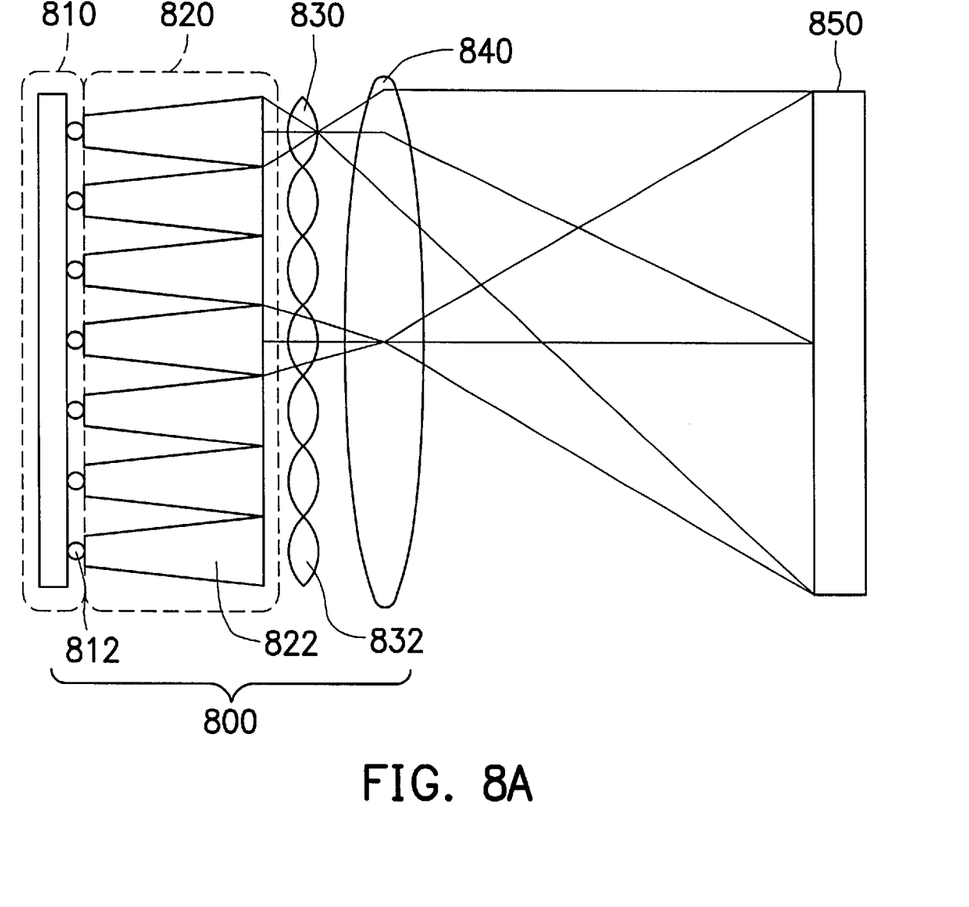
FIG. 8A shows a sixth embodiment of the invention.

FIG. 8A shows a sixth embodiment of the invention, in which a wedged glass rod is used to form an illumination uniformizing means.

In FIG. 8A, an illumination device comprises a light emitting device light source module 810, a wedged glass rod array 820, a lens array 830, and a light converging lens 840. The light emitting device light source module 810 comprises a number of light emitting devices 812. The wedged glass rod array 820 comprises the same number of wedged glass rods 822 as the light emitting devices 812. Each wedged glass rod 822 is disposed closely in front of a corresponding light emitting device 812, so that each light emitted from each light emitting device 812 is collected by the corresponding wedged glass rod 822.

Figure 8B:
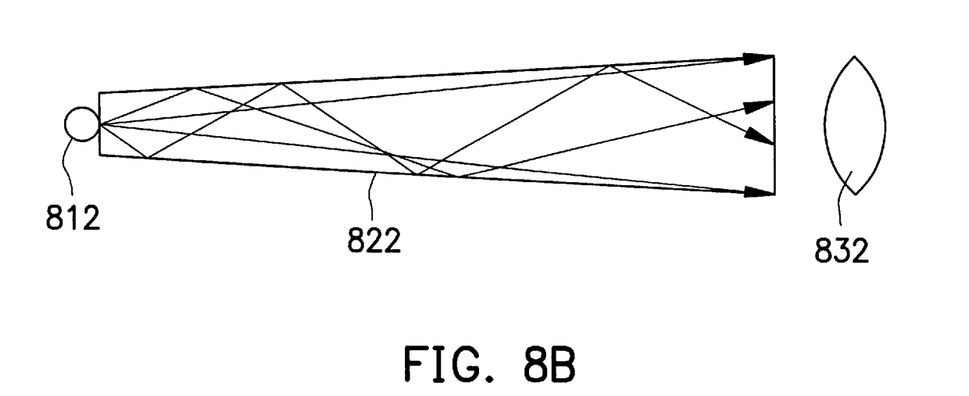
FIG. 8B shows the operation mechanism of a wedged glass rod shown in FIG. 8A.

In FIG. 8B, the light path collected by the wedged glass rod 822 is shown. In the wedged glass rod 822, the light transmits in a way of total reflection by the inner surface of the wedged glass rod 822. The light becomes a small angle deflected light while reaching the other end of the wedged glass rod 822. The shape of the wedged glass rod 822 can be a cone shape as shown in the figure, or other shape with the same effect. That is, the wedged glass rod 822 has a small aperture for an incident light, that is, a smaller incident aperture, and a larger aperture at the other end of the wedged glass rod 822, that is, a larger projection aperture. In some other applications, wedged glass rod having two apertures with the same dimension, for example, a columnar shape or a rectangular rod may also be employed.

The light travelling through each wedged glass rod 822 then reaches one of the lenses 832 of the lens array 830 to project on a light valve 850 uniformly. Before projecting on the light valve 850, the light is converged by a light converging means 840, so that all the light can be collected and projected on the light valve 850 efficiently.

Similar to the previous embodiment, each of the light emitting devices does not have to corresponding to a certain one of the wedged glass rod. More than one light emitting devices may be disposed and corresponding to only one wedged glass rod.

Fresnel type lens, holographic optical element, or binary optical device, can be adapted for fabricating lenses 832 and the light converging means 840. Moreover, similar to the above mentioned embodiments, the lens used in the embodiment may be made from plastic material which has a lower fabrication cost.

The Seventh Embodiment

Figure 9:
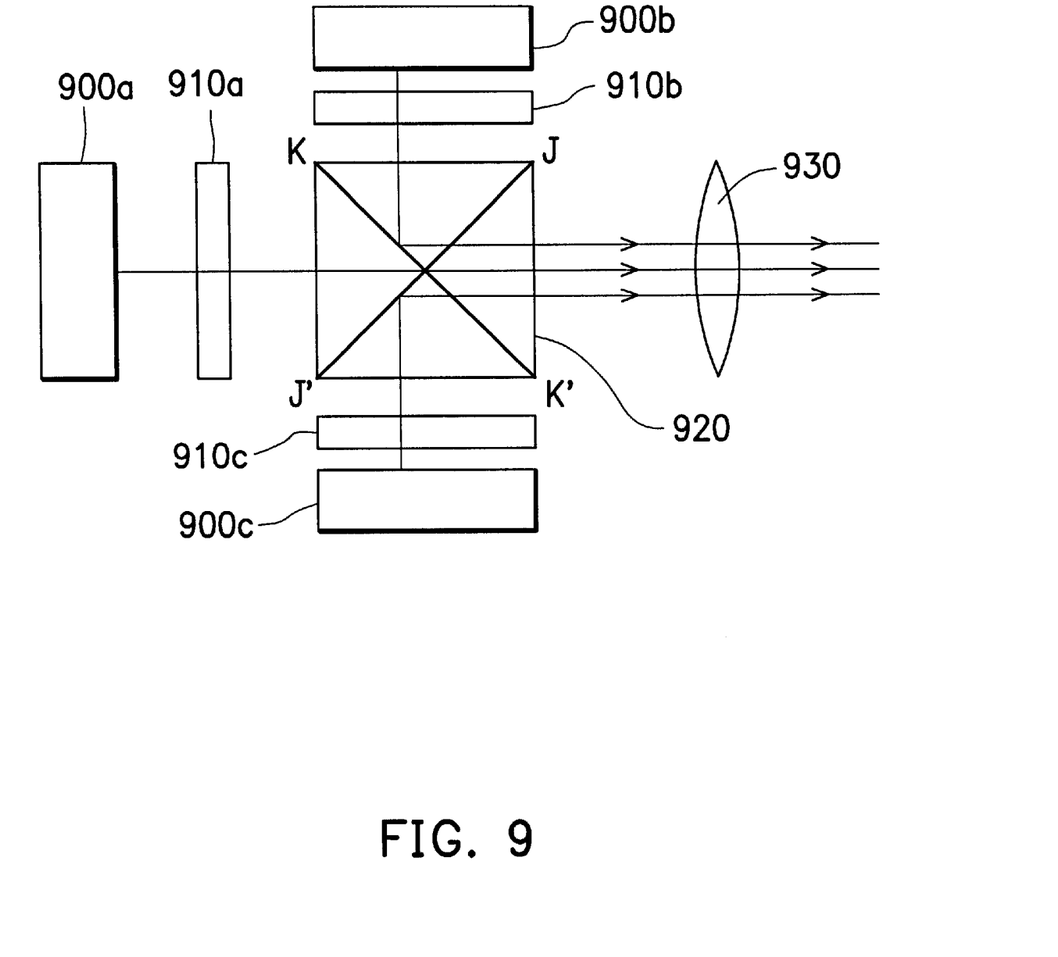
FIG. 9 shows an image projection apparatus comprising an illumination device provided in the invention.

In FIG. 9, an image projection apparatus using an illumination device in the invention is shown.

As shown in the figure, the projection apparatus comprises three illumination devices with different light sources. A red light illumination device 900a is used for a red LCD light valve 910a, a blue light illumination device 900b is used for a blue LCD red valve 910b, a green light illumination device 900c is used for a green LCD light valve 910c. The illumination devices 900a, 900b, 900c can be selected from any of the above embodiments. The uniform red (R), blue (B), green lights emitted from the illumination devices 900a, 900b, 900c respectively are then traveling to a color synthesizing means 920, which further comprises a spatially synthesizing means, for example, an X prism, a combination of dichroic mirrors and a sequentially synthesizing means, for example, time sequential controller.

In the X prism, the green light and the red light can transmit through the optical plane KK', while the blue light is reflected therefrom. Whereas, the blue light and the green light can transmit through the optical plane JJ', but the red light is reflected therefrom. The sequentially synthesizing means includes a sequence order controller (not shown), for example, a time multiplex, to control the projection order of the three primary color lights. When the sequential frequency time sequential controller is fast enough, a required color by certain combination of the three colors is obtained. A color is thus obtained by synthesizing these three lights. The synthesized light is then projected on a screen via a projection object mirror 930 to display the image.

Other embodiments of the invention will appear to those skilled in the art from consideration of the specification and practice of the invention disclosed herein. It is intended that the specification and examples to be considered as exemplary only, with a true scope and spirit of the invention being indicated by the following claims.

What is claimed is:

1. An illumination device, comprising:
    a light source, comprising an array of a plurality of light emitting devices, and
    an illumination uniformizing means in a form of a back light panel, further comprising:
    an incident plane;
    a bottom plane and a projection plane disposed opposite thereto, the bottom plane and the projection plane being connected to the incident plane at a lower side and an upper side thereof, respectively, the bottom plane further comprising a scattering pattern for uniformizing a light incident from the incident plane; and
    a side plane, disposed opposite the incident plane, the side plane having an upper side connected to the projection plane and a lower side connected to the bottom plane; wherein
    the scattering pattern comprises a plurality of triangle patterns each of which has a top interior angle originating from the incident plane and a bottom side located at the side plane.

2. The device according to claim 1, wherein the light emitting devices comprises one of light emitting diodes, organic light emitting diodes, laser diode, field emission display, and cold cathode fluorescence lamp.

3. The device according to claim 1, further comprising a polarization converter disposed between the illumination uniformizing means and a light valve.

4. The device according to claim 3, wherein the polarization converter further comprises a plurality of ¼ wavelength plates and a plurality of polarization beam splitters, the ¼ wavelength plates being disposed in front of the polarization beam splitters, and the polarization beam splitters being arranged in a zigzag shape, each of the polarization beam splitter having a right angle with the adjacent polarization beam splitter.

5. The device according to claim 1, wherein the polarization converter further comprises a plurality of polarization beam splitters and a plurality of ½ wavelength plates, the polarization beam splitters being arranged parallel to each other with an tilt angle to an incident light, and the ½ wavelength plates each being disposed in front of every other of the polarization beam splitters with a right angle to the incident light.

6. The device according to claim 1, wherein the illumination uniformizing device further comprises a plurality of columnar light converging lenses and a plurality of mirrors alternately disposed on the projection plane as an array.

7. The device according to claim 6, wherein each columnar lenses includes a collimate cylindrical lens.

8. The device according to claim 6, wherein each columnar light converging lens further comprises a row of light converging lenses.

9. The device according to claim 6, wherein the columnar light converging lens comprises Fresnel type lenses.

10. The device according to claim 1, wherein the scattering pattern on the bottom plane of the illumination uniformizing means comprises a scattering pattern gradually condensed from the incident plane towards the side plane.

11. The device according to claim 1, wherein the scattering pattern comprises a plurality of lines gradually diffusing from the side plane toward the incident plane.

12. The device according to claim 1, wherein the back light panel has a wedge shape wherein the distance between the bottom plane and the projection plane is greater at the incident plane than at the side plane.

* * * * *